(No Model.)

C. T. PRATT.
DRILL CHUCK.

No. 455,689. Patented July 7, 1891.

Attest:
C. H. Benjamin
Bernard J. Neefe

Inventor:
Charles T. Pratt
by D. Walter Brown
his attorney

THE NORRIS PETERS CO., PHOTO-LITHO., WASHINGTON, D. C.

UNITED STATES PATENT OFFICE.

CHARLES T. PRATT, OF CLAYVILLE, NEW YORK, ASSIGNOR TO THE PRATT CHUCK COMPANY, OF SAME PLACE.

DRILL-CHUCK.

SPECIFICATION forming part of Letters Patent No. 455,689, dated July 7, 1891.

Application filed April 1, 1891. Serial No. 387,297. (No model.)

*To all whom it may concern:*

Be it known that I, CHARLES T. PRATT, a citizen of the United States, and a resident of Clayville, in the county of Oneida and State of New York, have invented certain new and useful Improvements in Drill-Chucks, of which the following is a specification.

My invention relates to improvements in drill-chucks, and especially to improvements in that class of drill-chucks which have a chamber in which work the jaws which grip the stock of the drill. The movement of the jaws is effected by means of a screw or screws, which usually engage with only one side of each jaw. In practice it is found that by reason of this engagement of the screws with only one side of each jaw the said jaws acquire a tendency to tilt, whereby said jaws act as wedges to force apart the walls of said chamber and so spread the chuck. It is the purpose of my improvement to prevent said spreading of the chuck, and the means whereby I accomplish this result are fully set forth and described in the description of my invention, which is hereinafter contained, reference being had to the drawings which accompany this specification.

Figure 1:
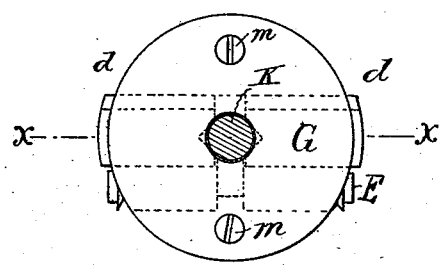
Figure 2:
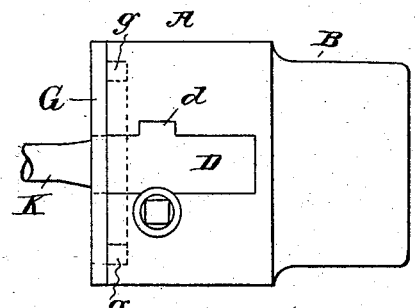
Figure 3:
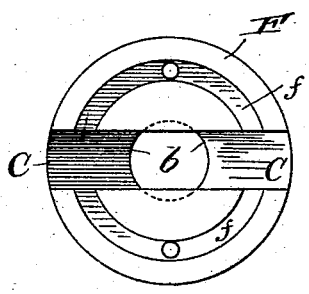
Figure 4:
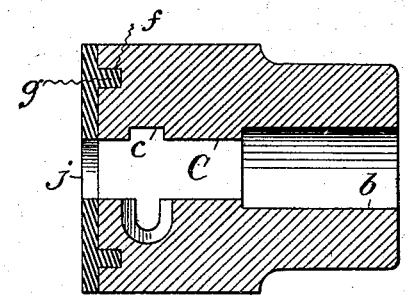
Figure 5:
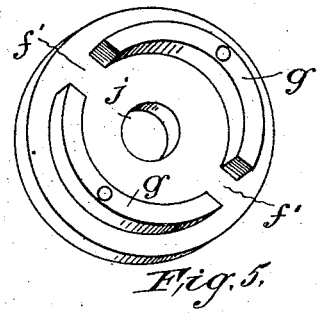

Referring now to said drawings, Figure 1 is an end view of the chuck with the strengthening-plate in place on the end of the chuck. The jaws and their operating-screws are indicated by dotted lines. Fig. 2 is a side elevation of the chuck, the strengthening-plate being shown in place on the chuck. Fig. 3 is an end view of the chuck, the strengthening-plate and jaws being removed to clearly show the groove for the rib of the said strengthening-plate and the chamber for the jaws. Fig. 4 is a longitudinal axial section of the chuck on the line $x\ x$ of Fig. 1. The manner of engagement of the strengthening-plate with the chuck-body is clearly shown. The jaws are removed. Fig. 5 is a view of the strengthening-plate.

The chuck A B is formed in any usual manner, preferably of steel, and of cylindrical shape, and with the rear part B of somewhat smaller diameter than the front part A, and said part B is bored, as at $b$, to receive an arbor in the usual manner. The chuck A B has the common deep chamber C, in which work the gripping-jaws D D. Said jaws are actuated in the well-known manner by the screw E, and said jaws D D are guided by means of the ribs $d\ d$ and recess $c$; but since said jaws D D and screw F are not part of my present invention they do not herein require further description.

In the front face F of the chuck A B—that is to say, that face from which projects the drill K—is a groove $f$, preferably of a circular shape, as seen in Fig. 3; and said groove $f$ is struck with such a radius as to be about midway between the chamber C and the circumference of the chuck, so that there is good thickness of metal to either side of said groove $f$. In said groove $f$ fits the circular tongue or rib $g$ of the strengthening-plate G, which strengthening-plate G is of the same diameter as the front part A of the chuck A B. Thus said plate G forms a cap-plate for the chuck A B, as is clearly seen in Figs. 2 and 4, and the outer surface $h$ of said plate G serves as a stop-gage from which to measure for various purposes—as, for example, to measure when it is desired to drill to any certain depth. Said plate G is perforated with the central cylindrical hole $j$, of a size to admit any drill up to that diameter which is the largest that it is desirable to use in the chuck, and the aforesaid rib $g$ of the plate G is cut away at $f'\ f'$, corresponding with the chamber C, so that the jaws D D can move to and fro through the slots $f'\ f'$, for it is to be understood that said jaws D D are formed with their top sides about flush with the front face F of the chuck A B, so that said jaws can pass under the plate G. Thus the jaws D D can be drawn out of the chuck without removing the plate G. This arrangement is very useful and an important feature of my invention, since by reason of it if the jaws D D become clogged with dirt they can be removed for cleaning without disturbing the plate G. Now the plate G being fashioned, as hereinbefore described, it is placed on the face F of said chuck, and with the tongue $g$ inserted into the groove $f$, and then the said plate G is secured to the chuck A B by screws $m\ m$. Evidently the spreading of the chuck A B by the wedge-like action of the jaws D D or otherwise will be prevented by the tongue g of the plate G. Generally in assembling the parts both the screw E and the jaws D D will be inserted in the chuck before the cap-plate G is put on; but, as will be evident from the foregoing description, the jaws can be inserted after the cap-plate G is fixed on the chuck.

In place of the groove f on the face F of the chuck A B and the tongue g on the plate G, I can of course reverse the arrangements, forming the tongue or rib on the face F of the chuck A B and the groove in the plate G, the one arrangement being clearly the equivalent of the other.

Having thus fully set forth and described my invention, I declare that what I claim is—

1. In a drill-chuck, a strengthening-plate adapted to engage with the front face of the drill-chuck between the center and the circumference of said face, substantially as described.

2. In a drill-chuck, the combination of a chuck-body having a chamber for the gripping-jaws and a grooved face, and an end plate having a tongue or rim adapted to engage with the groove in the face of the chuck, substantially as described.

3. In a drill-chuck, the combination of a chuck-body having a transverse diametrical chamber in which gripping-jaws work, and having an end plate adapted to engage with the face of the chuck between the center and the circumference of said face, said end plate having a diametrical channel corresponding with the aforesaid chamber in the chuck to admit of free movement of said jaws, as described.

Signed at Clayville, in the county of Oneida and State of New York, this 17th day of March, A. D. 1891.

CHARLES T. PRATT.

Witnesses:
W. J. MILLARD,
JOHN DEMPSEY.